Jan. 17, 1933. E. J. BRADY 1,894,459
GAS APPARATUS
Filed Oct. 26, 1928

WITNESS:
R. R. Kitchel

INVENTOR
Edward J. Brady
BY
Augustus B. Stoughton
ATTORNEY.

Patented Jan. 17, 1933

1,894,459

UNITED STATES PATENT OFFICE

EDWARD J. BRADY, OF PHILADELPHIA, PENNSYLVANIA, ASSIGNOR TO THE UNITED GAS IMPROVEMENT COMPANY, OF PHILADELPHIA, PENNSYLVANIA, A CORPORATION OF PENNSYLVANIA

GAS APPARATUS

Application filed October 26, 1928. Serial No. 315,131.

The present invention relates to the removal of solid particles from gases.

The object of the invention is to provide new and improved apparatus for effecting such removal and particularly to provide means for effectively and economically removing particles of solids such as ash and fuel from the hot gases issuing from a water gas generator or producer.

In the manufacture of carburetted water gas for instance, air and steam are passed alternately through the fuel bed of the water gas generator. The air blast gases are passed through the carburetter and superheater and burned with secondary air. These vessels are filled with checkerbrick which stores the heat of the blast gases. During the steaming operation or run, steam is passed through the fuel bed of generator forming water gas, all or a part of which is passed through the carburetter and superheater and there enriched by oil sprayed into the carburetter. The stored heat in the checkerbrick, vaporizes and cracks the oil and produces fixed gases from the oil vapors.

In order to secure economy and high capacity the cycles of air blasting and steaming are made short, and a very high rate of blast is employed and a large volume of hot producer gas and products of combustion issue from the generator, in a given time, producing velocities in the connection between the generator and carburetter of the order of 7,000 linear ft. per min. During the steam run the velocity may be of the order of 3,000 linear ft. per min.

The high velocity of flow through the fuel bed itself and through the connection between the generator and carburetter causes considerable quantities of fuel to be blown over into the carburetter and superheater. This material varies greatly in size and quantity depending on the fuel used and operating conditions. A large blow hole in the generator producing channelling of the blast will cause coke pieces as large as base balls to blow over.

This blown over material is a serious inconvenience in operating. Coarse particles may stop up the gas passages between the checkerbricks in the carburetting vessels and stoppages may be caused by even the fine material, which is caught and retained by the tar deposited on the checkerbrick from the carburetting oil. Large quantities of blown over material will also accumulate in the bases of the carburetter and superheater as well as in the base of the waste heat boiler if one is employed.

The set must be periodically put out of operation to remove the blown over material.

Even that part of the material which is carried through the stack constitutes a serious nuisance not only in the neighborhood of the plant but in the plant itself.

It is therefore desirable to remove as much of the blown over material (from the gases) as possible economically and before its entrance to the carburetting vessels.

A number of practical considerations make an efficient removal of this material a difficult problem. The gases containing the material are at a relatively high temperature—1200° to 1300° F. and it is desirable to have the apparatus such as may be conveniently lined with a refractory material.

The apparatus must be well insulated as it is necessary to conserve the heat in these gases for the efficient operation of the gas process, for instance an appreciable cooling of the air blast gases will delay their ignition on entrance to the carburetter and cause the loss of a considerable portion of their heat as well as resulting in a low carburetter top temperature, with a harmful effect on the carburetting operation.

The apparatus must be relatively simple as the use of special refractory shapes such as vanes for the direction of the gases is impracticable. Thin vanes of refractories would be rapidly eroded and soon cracked by the changes in temperature during the cycle.

The apparatus should be compact to meet the space requirement of existing gas plants. The apparatus should remove the solid material efficiently and without the development of excessive back pressure. Any additional back pressure requires the raising of the blast pressure an equivalent amount to blast the fuel bed at the same rate and any considerable raising of the blast pressure without increasing the blast rate is very expensive.

The applicant has made a detailed investigation of this problem and performed a long series of experiments on various types of apparatus designed to meet the above requirements. As a result of these experiments the apparatus of the present invention was developed.

In the course of this investigation it was brought out that small and apparently trifling changes in the shape of the apparatus sometimes produced changes of great magnitude in the efficiency or the back pressure developed or both.

The apparatus of the present invention consists of a chamber shaped substantially as an upright frustrum of a cone and having a hopper bottom, furnished with a closable opening for the removal of solid material, a gas inlet entering the chamber tangentially and preferably downwardly adapted to swirl the gas within the chamber, and a gas outlet from the chamber at a higher elevation than the inlet and leading off tangentially and in the direction of the swirl of the gas.

This application is directed to my novel combination of a gas generator or producer either for producer gas, water gas or carburetted water gas and a novel structure for removing solid particles from the gas. The structure for removing solid particles from the gas when not in combination is the subject of my divisional application Serial No. 550,838 filed July 15, 1931 copending with the present application.

The apparatus will be described in connection with the figures in which.

Figure 2:
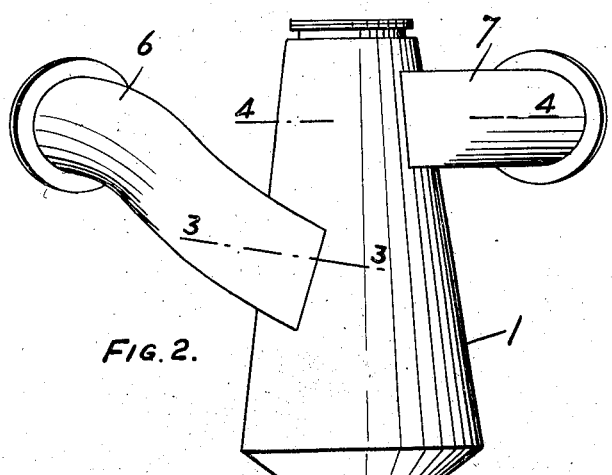
Fig. 2 shows an elevation of the apparatus itself.
Figures 3, 4:
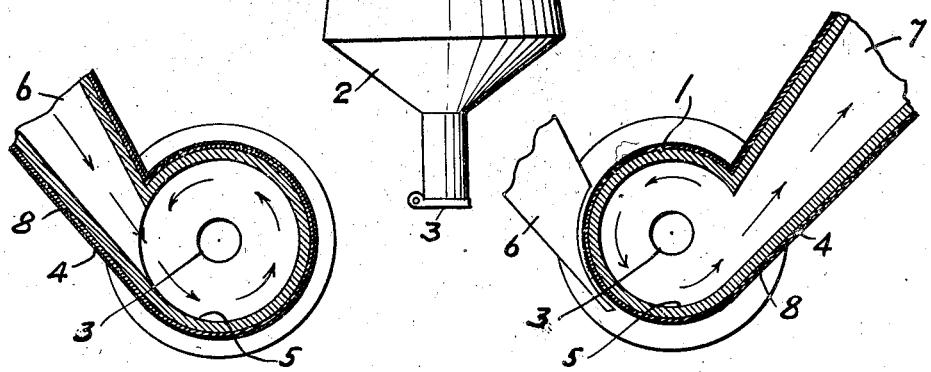
Fig. 3 shows a horizontal cross section along the line 3—3 in Fig. 2.
Fig. 4 shows a horizontal cross section along the line 4—4 of Figure 2.

Referring to Figures 2, 3 and 4; 1 generally indicates the chamber of the apparatus which is in the form of an upright frustrum of a cone in which the larger diameter is vertically lower than the smaller diameter and is provided with the hopper bottom 2 which has the closable opening 3. In arrangement shown the chamber is provided within the shell 4, with the refractory lining 5, and the heat insulating material 8. When handling gases of low or moderate temperature this lining may be dispensed with.

6 indicates the gas inlet which enters the chamber tangentially and downwardly as shown. This inlet may be constricted and of decreasing lateral dimension as shown in the Figure 3, if a higher inlet velocity is desirable than would be obtained from an unrestricted inlet.

This will depend, of course, upon the velocity of the gas as delivered from the apparatus, in connection with which my separator is used. 7 is the gas outlet which leads tangentially from the chamber at a higher elevation than the inlet 6. The horizontal width of the outlet pipe is somewhat narrowed at the point of outlet, but the outlet is not necessarily of constructed area, the object being to skim off the gases at the periphery of the gas stream, where the velocity is highest. It was found experimentally that this is of importance in minimizing back pressure. The outlet 7 may therefore have an increasingly lateral dimension.

In operation the gas laden with solid particles enters the chamber through the inlet 6 and is swirled downwardly within the chamber. The solid particles are driven by centrifugal force to the outside of the swirling gas stream and are thrown against th sloping wall of the chamber. Due to the downward incidence of their contact with the wall and the slope of the wall the rebound of the particles is directed downward toward the base of the chamber, where assisted by gravity the particles settle. The height of the gas entrance above the base is chosen such that the gas swirl will not be carried down far enough to pick up the solid particles which have settled out.

The swirling gas after the initial downward swirl which takes place immediately after its entrance, swirls upwards through the chamber and finds an easy and rapid exit through the tangential gas outlet, which leads off in the direction of the swirl. With the tangential outlet the back pressure developed in the apparatus is much lower than if an axial outlet were provided. The separation caused by the combination of the downward tangential inlet and the sloping wall of the chamber, with the outlet above the inlet, is so effective that the gases may leave tangentially through the outlet at a considerable velocity without carrying dust out of the apparatus. An axial outlet is therefore made unnecessary from a standpoint of separation efficiency and is a detriment from the standpoint of back pressure developed, a point confirmed by my experimentation.

Figure 1:
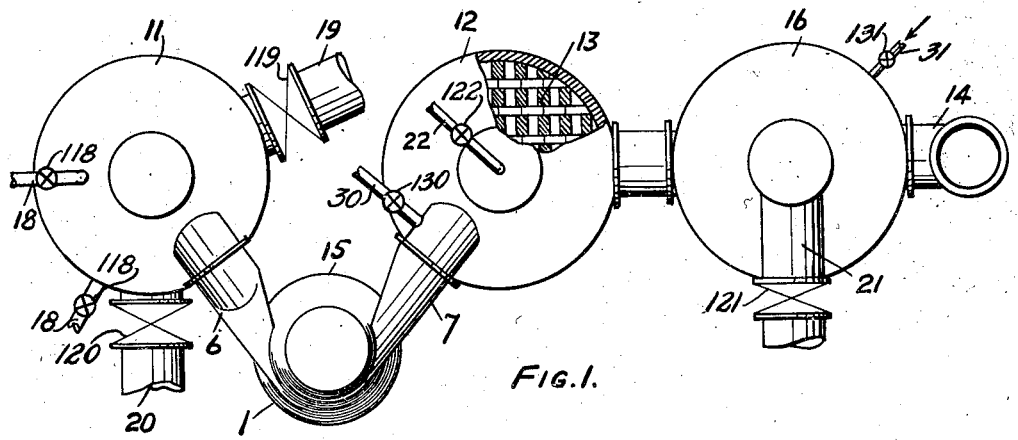
Fig. 1 shows a plan of the apparatus in connection with a carburetter or water gas set.

Referring to Figure 2—This Figure shows an elevation of the separator shown in plan in Figure 1. Element 1 is the shell of the apparatus as before.

It is to be noted that the angle (on the horizontal plane) between the inlet and the outlet may be widely varied to suit the arrangement of the apparatus to which the separator is connected.

Referring to Figure 1—This figure shows a plan view of a carburetted water gas set with the separator connected between the water gas generator and the carburetter, 11 is the generator, 12 the carburetter, 16 the superheater (the two latter vessels are filled with checkerbrick as indicated at 13), 14 the stack, 15 is the separator provided with the inlet 6 leading from the top of the generator and the outlet 7 leading to the top of the carburetter, 18 are steam admissions to the generator having valve 118 therein. 19 is the air blast inlet having valve 119 therein, 20 is a combustible gas offtake from the generator leading to the washbox (not shown) as does the combustible gas offtake 21 from the superheater 16. Conduit 20 has valve 120 therein and conduit 21 has valve 121 therein. 22 is the oil supply to the carburetter and has valve 122 therein.

In operation the solid fuel bed in the generator is air blasted, the hot blast gases heavily laden with particles of fuel and ash pass into the separator 15 through connection 6. The blown over fuel and ash particles are deposited in the separator, the cleaned gas passing through connection 7 to the carburetter 12 and superheater 13 and thence to the stack 14. Secondary air is admitted to the carburetter through the pipe 30 having valve 130 therein leading into pipe 7. The run is now made and steam is passed up through the incandescent fuel bed, producing water gas which also passes through connection 6 into the separator 15 before its entrance to the carburetter. Solid particles carried out of the generator are deposited in the separator. Oil is sprayed into the carburetter during the passage of the water gas through it, and the oil vapors are fixed in the superheater. The carburetted water gas passes to a wash box, not shown, through connection 21.

In the water gas apparatus shown for illustration the down run may be made by admitting steam to the top of the generator which does not pass through the carburetter and superheater but is led directly from the base of the generator to the wash box. It is not passed through the separator 15.

If it is desired to make a down run with superheated steam, steam is admitted to the superheater top through pipe 31 having valve 131 therein, and passes through the superheater, carburetter, and dust separator into the top of the generator. Due to the fact that both the connection between the separator and the carburetter and the separator and the generator are tangential to the separator, no appreciable back pressure is developed in the separator, during the passage of the steam through it.

The apparatus of the present invention has been developed chiefly for use with water gas apparatus but it is capable of convenient use and has advantage in many applications, in which it is desirable to remove solid particles from a stream of gas.

I claim:

1. Carburetted water gas apparatus comprising a separate water gas generator, a separate carburetter, a separate structure for the removal of solid particles from the gas comprising a chamber of upright frusto-conical shape, a gas inlet pipe leading from the generator and connecting tangentially with said structure, and a gas outlet pipe leading off tangentially from said structure to said carburetter.

2. Carburetted water gas apparatus comprising a separate water gas generator, a separate carburetter, a separate structure for the removal of solid particles from the gas comprising a chamber of upright frusto-conical shape, a gas inlet pipe leading from said generator and connecting downwardly and tangentially with said structure, and a gas outlet pipe leading off tangentially from said structure to said carburetter.

3. Carburetted water gas apparatus comprising a separate water gas generator, a separate carburetter, a separate structure for the removal of solid particles from the gas comprising a chamber of upright frusto-conical shape, a gas inlet pipe of decreasing lateral dimension leading from said generator and connecting downwardly and tangentially with said structure, and a gas outlet pipe of increasing lateral dimension leading off tangentially from said structure to said carburetter.

4. Carburetted water gas apparatus comprising a separate water gas generator, a separate carburetter, a separate structure for the removal of solid particles from the gas comprising a chamber of upright frusto-conical shape, a gas inlet pipe of decreasing lateral dimension leading from said generator and connecting downwardly and tangentially with said structure, and a gas outlet pipe of increasing lateral dimension leading off tangentially from said structure at a higher level than said inlet pipe to said structure.

5. A water gas apparatus comprising a separate water gas generator, a separate vessel adapted to contain refractory material, a separate structure for removing solid particles from the gas comprising a frusto-conical chamber, a gas inlet pipe leading from said generator and connecting downwardly and tangentially with said structure, and a gas outlet pipe leading off tangentially from said structure to said vessel.

6. A water gas apparatus comprising a separate water gas generator, a separate vessel adapted to contain refractory material, a separate structure for removing solid particles from the gas comprising a frusto-conical chamber, a gas inlet pipe leading from said generator and connecting downwardly and tangentially with said structure, and a gas outlet pipe leading off tangentially and above the inlet from the first pipe from said structure to said vessel.

7. A gas manufacturing apparatus comprising a separate gas generator, a separate structure for removing solid particles from the gas comprising a frusto-conical chamber, a gas inlet pipe leading from said generator and connecting downwardly and tangentially with said structure, and a gas outlet pipe leading off tangentially from said structure.

8. A gas manufacturing apparatus comprising a separate gas generator, a separate structure for removing solid particles from the gas comprising a frusto-conical chamber, a gas inlet pipe leading from said generator and connecting downwardly and tangentially with said structure, and a gas outlet pipe leading off tangentially and above the inlet from said first pipe to said structure.

EDWARD J. BRADY.